C. L. BAIR.
VEHICLE TOP BOW HOLDER.
APPLICATION FILED AUG. 1, 1914.
1,171,919.
Patented Feb. 15, 1916.
2 SHEETS—SHEET 2.
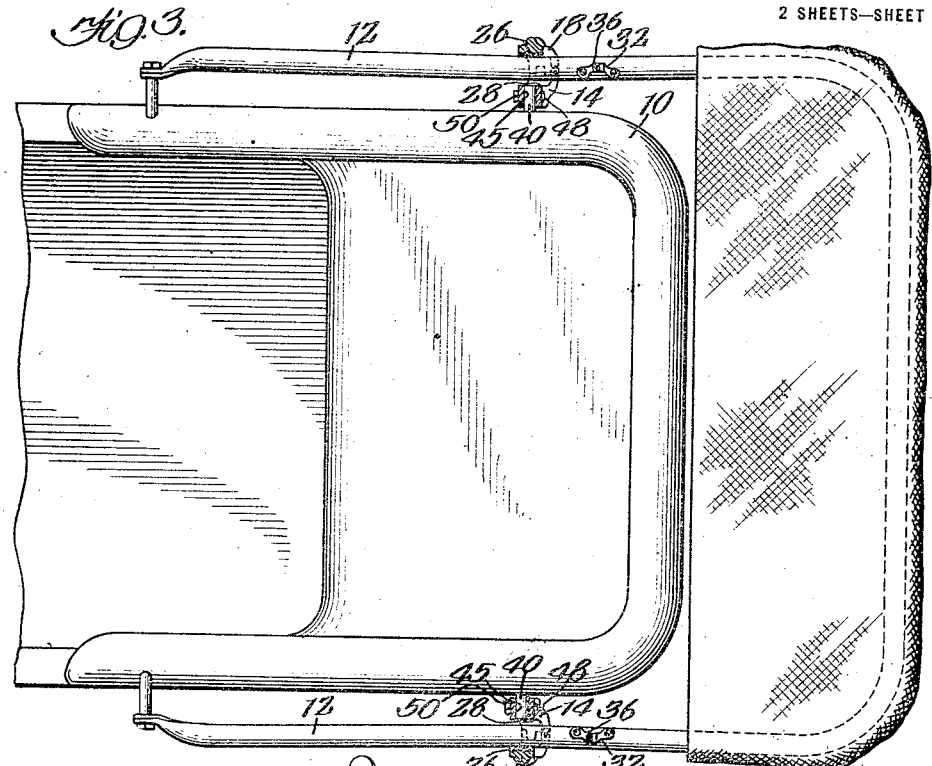
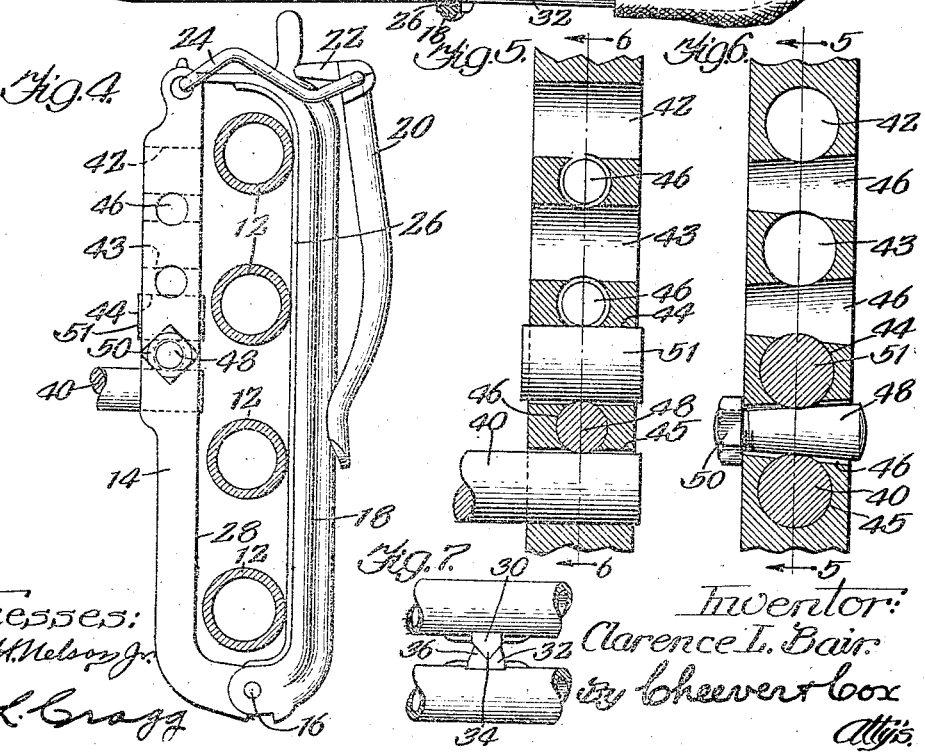

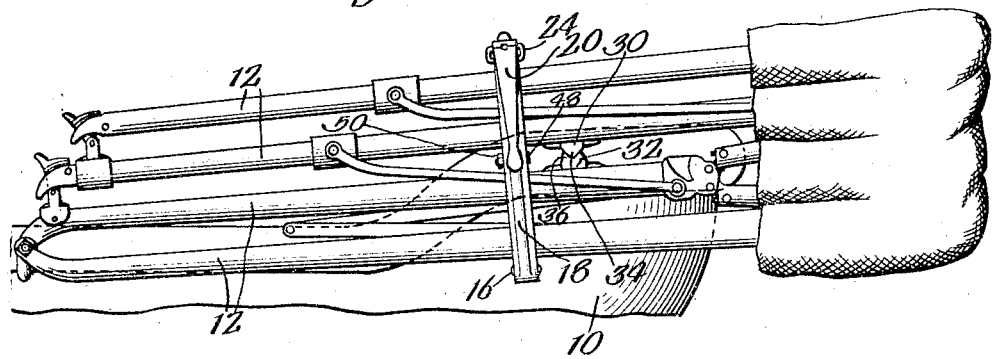
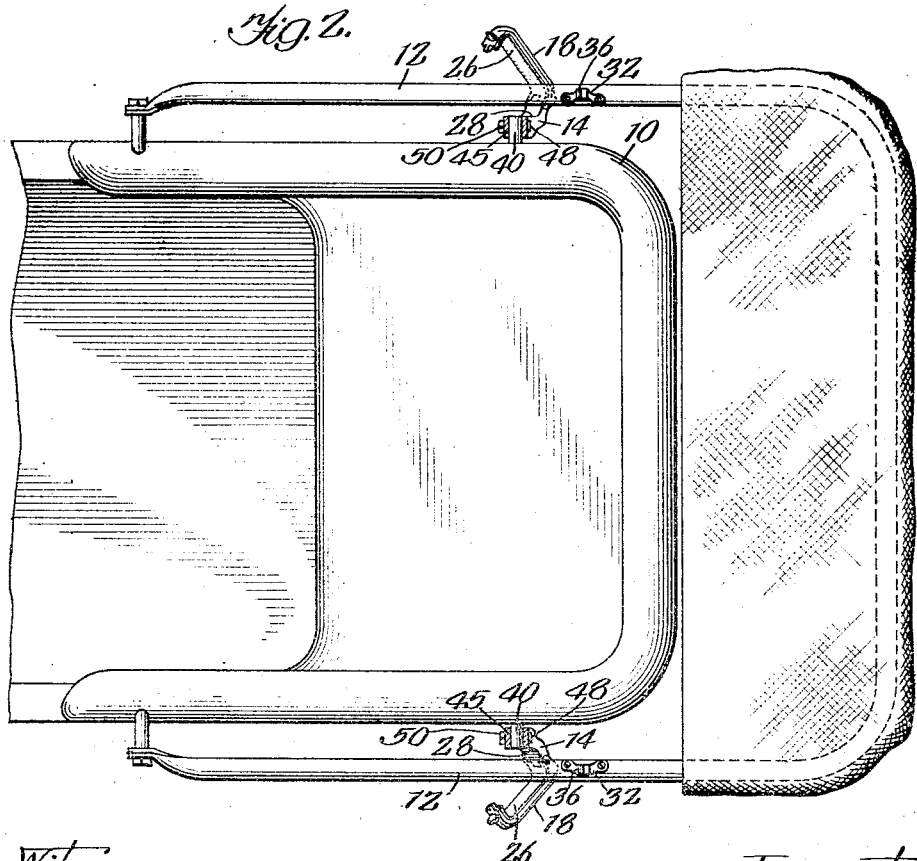

UNITED STATES PATENT OFFICE.

CLARENCE L. BAIR, OF CHICAGO, ILLINOIS, ASSIGNOR TO AUTO SPECIALTIES MANUFACTURING CO., OF SAN FRANCISCO, CALIFORNIA, A CORPORATION OF CALIFORNIA.

VEHICLE-TOP-BOW HOLDER.

1,171,919.	Specification of Letters Patent.	Patented Feb. 15, 1916.

Application filed August 1, 1914. Serial No. 854,432.

*To all whom it may concern:*

Be it known that I, CLARENCE L. BAIR, a citizen of the United States, residing at Chicago, in the county of Cook and State of Illinois, have invented a certain new and useful Improvement in Vehicle-Top-Bow Holders, of which the following is a specification.

This invention relates to vehicle top bow holders of the general class set forth in my prior Patent No. 866,416 of September 17, 1907.

One object of the invention is to provide a device of this class for holding the bows of a top of a vehicle and particularly an automobile in closed or folded position, which is adjustable vertically with reference to the body of the vehicle and the top so as to allow for proper positioning.

A further object of the invention is to provide such a bow holder which by being properly combined with the body of the vehicle and the bows of the top may be made with parallel sides, particularly inside the holder thereby dispensing with the notches or recesses spaced by tongues of the same general type shown in said prior patent.

The invention consists in a device capable of carrying out the foregoing objects which can be very easily and cheaply made and installed, which operates satisfactorily and is not liable to get out of order.

It further consists in the features and details which will be hereinafter more fully described and claimed in the specification.

In the drawings, Figure 1 is a side view of a portion of a vehicle body having a top thereon secured in lowered position by the device of this invention in its preferred form. Fig. 2 is a plan view of the same parts as in Fig. 1 showing the parts of the bow holder separated for the admission and later adjustment of the bows. Fig. 3 is another plan view partially in section showing the bow holder closed. Fig. 4 is an enlarged detailed view of the bow holder, the inclosed bows being shown in section. Fig. 5 is an enlarged sectional side view through the stock or left hand member of Fig. 4 on line 5—5 of Fig. 6. Fig. 6 is a sectional detail view on the line 6—6 of Fig. 5. Fig. 7 shows the details of a spacing device for separating the individual bows of the top.

As has heretofore been stated the device is applicable to any sort of vehicle and in the drawings the rear portion of a vehicle body 10 is shown equipped with a one man top of the type fully shown, described and claimed in my prior application Serial No. 812,047, filed January 14, 1914, the bows thereof being designated by the numeral 12. The device of this application is used to secure said bows in position adjacent to each other as indicated in Fig. 1. The holding device is the bow holder having the stock 14 to which is pivoted at 16 an arm 18 detachably securable to the stock by the locking lever 20 formed with the lug 22 and connected to the stock by the connecting link 24, these latter parts being more fully shown and described in my prior Patent No. 1,010,110 of November 28, 1911. The device differs from those shown in my said prior patent in that the inner face 26 of the arm is straight and parallel with the inner face 28 of the stock, said inner face 26 of the arm being provided, if desired, with a padding rubber or cushion as shown, though this may be omitted if desired without departing from the invention. The making of this inner face 26 smooth simplifies considerably the method and reduces the cost of manufacture of the device in the first instance and reduces the liability of the padding getting out of order in use. Furthermore, the bow holder having this inner straight face has the advantage that the bows may be held at any point upon this inner face of the arm instead of its being necessary to move them and put them in particular compartments on the arm as was heretofore necessary in the device of the above mentioned prior patents.

In order to have the bow holders of this invention operate successfully in connection with the bows 12 of the top, two bow holders are preferably provided one on each side of the body 10 and they are so located that the normal distance between the inner faces 26 of the arms of the bow holders when closed is less than the normal distance between the outside edges of the opposite bows of the top when the same are not compressed by the bow holder arms and the bows themselves are made of spring material so that when the bow holder arms are put in position and closed, as illustrated in Fig. 3, they compress and inwardly flex the bows 12 sufficiently so that the spring of the bows holds them in rigid position against arms of the bow holder. This flexing of the bows is clearly shown in Fig. 3. In order to insure the bows of the top maintaining their parallel position one with the other, when thus compressed, the separators illustrated in Figs. 3 and 4 are preferably, but not necessarily, provided. These consist of interfitting lugs 30 and 32 secured respectively to adjacent bows, these lugs being provided with projection 34 and corresponding recess 36 one on each of the lugs, so shaped as to form a track cross wise of the bows for sliding engagement of the parts named. This device allows any bow which may be out of vertical alinement with its adjacent bow or bows to move inward toward the vehicle body while at the same time these separating devices prevent longitudinal movement of the bows with reference to each other.

It is also desirable, if not necessary, that the bow holder of this invention be from time to time adjustable up and down the vehicle body 10 so as to properly secure the bows of the top in different selected horizontal positions as the user may desire or construction of the device, not here directly involved, may demand. In carrying out this object, the vehicle body is provided on each side with a horizontal projecting stud or pin 40. Through a selected portion of the stock 14 of the bow holder are provided a plurality of parallel holes 42, 43, 44 and 45 adapted to receive this stud 40. In other words, the stock 14 is adapted to slip over the stud 40 using for the purpose any one of the holes 42 to 45 which may be selected by the user. Intermediate between the holes 42 to 45 and at right angles thereto are a plurality of other holes 46 of sufficiently large diameter so that their normal circumferences enter or cut the holes 42 to 45 heretofore referred to. These holes 46 are tapered so as to receive the tapered bolt 48 securable in position by the nut 50. When the parts are in the position shown in Fig. 4 and this tapered bolt 48 is put in position and the nut 50 is tightened up the bolt 48 is drawn into clamping engagement with the pin or stud 40 thus securing the bow holder upon the stud. In order to make this a stronger grip a supplemental bearing pin 51 is preferably placed parallel to stud 40 in the next adjacent hole as shown.

In the complete operation of the device the operator first properly locates the bow holder with reference to the vehicle in the manner described. He then places the bow holder in proper position having first swung arms 17 to the position of Fig. 2 to admit the bows of the top; he then closes the holder or moves the arms to the position of Figs. 3 and 4 in so doing flexing the bows 12 thus causing them to spring against the inner face 26 of the bow holder arm and thus be firmly secured in position with reference to the vehicle body 10 where they remain until such time as the operator desires to raise the top whereupon he releases the handle 20 of each bow holder and thus releases the arms 18, whereupon the top can be raised, after which the bow holders are usually closed and left on the side of the car until it is desired to again lower the top.

The stud, pin and bolt device for securing the holder to the vehicle body in adjusting position are divided out of my prior application Serial No. 812,047, filed January 4, 1914.

Having thus described my invention, what I claim as new and desire to secure by Letters Patent is,

1. A bow holder having a rear or base member provided with a plurality of parallel holes extending therethrough in one direction adapted to selectively receive a stud upon the vehicle body, and with a plurality of transverse holes between and entering the first mentioned holes, and a conical locking screw or bolt insertible through the last mentioned holes for the purposes set forth.

2. A bow holder having a rear or base member provided with a plurality of parallel holes extending therethrough in one direction adapted to selectively receive a stud upon the vehicle body, and an idle pin, and with a plurality of transverse holes between and entering the first mentioned holes, and a conical locking screw or bolt insertible through the last mentioned holes for the purposes set forth.

In witness whereof, I have hereunto subscribed my name in the presence of two witnesses.

CLARENCE L. BAIR.

Witnesses:
WILLIAM A. PAINTER,
J. W. TINORMIN.